United States Patent [19]

Ogg

[11] 3,720,102
[45] March 13, 1973

[54] WATER SEALED BOAT SPEEDOMETER

[75] Inventor: Robert D. Ogg, Portland, Maine

[73] Assignee: The Eastern Company, Naugatuck, Conn.

[22] Filed: April 15, 1971

[21] Appl. No.: 134,204

[52] U.S. Cl. ................................................. 73/186
[51] Int. Cl. ............................................ G01c 21/00
[58] Field of Search ........ 73/186, 184, 187, 228, 1 D, 73/139

[56] References Cited

UNITED STATES PATENTS

| | | | |
|---|---|---|---|
| 2,539,788 | 1/1951 | Matcovich | 73/186 |
| 3,468,163 | 9/1969 | Kenyon | 73/186 |
| 3,287,968 | 11/1966 | Kenyon | 73/186 |

Primary Examiner—Donald O. Woodiel
Attorney—Eckhoff, Hoppe, Slick, Mitchell & Anderson

[57] ABSTRACT

A boat speedometer of the type wherein a vane extends into the water from a torsion arm and speed is determined by the deflection of the arm, wherein the arm is at least partially hollow and the indicator mechanism is actuated by a shaft through the hollow arm. The arm is substantially surrounded by a water chamber and is supported at fixed points so that no motion is transmitted through a moving seal. This permits the torsion arm to be completely sealed to the water chamber so that the leakage problem normally associated with moveable seals is obviated.

6 Claims, 4 Drawing Figures

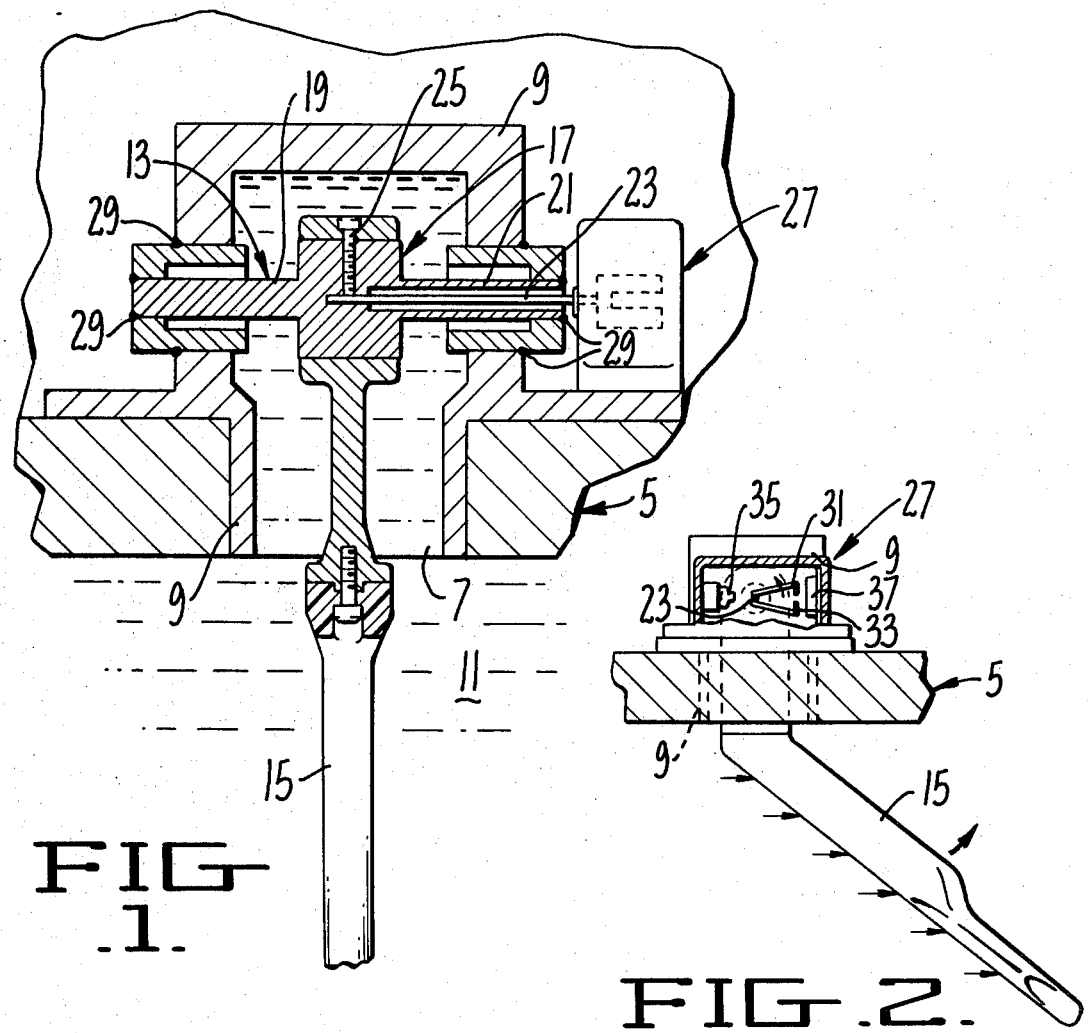
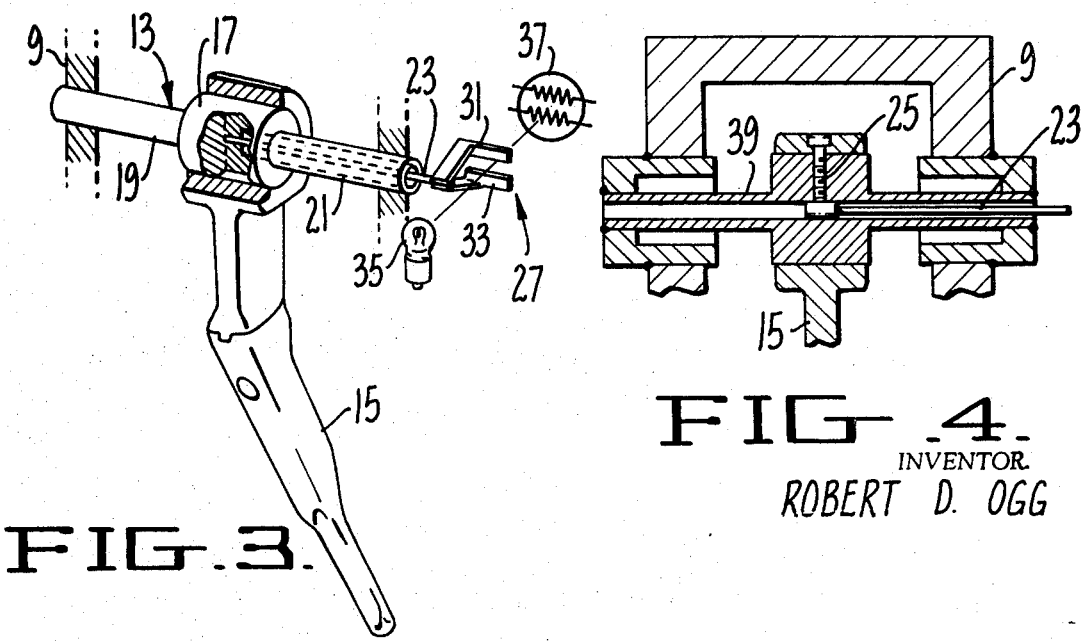
FIG. 1.
FIG. 2.
FIG. 3.
FIG. 4.
INVENTOR.
ROBERT D. OGG

WATER SEALED BOAT SPEEDOMETER

SUMMARY OF THE INVENTION

One of the most satisfactory types of boat speedometers is that wherein a vane or strut is suspended in the water by means of a torsion arm and the movement of the strut, and thus the arm, is measured and converted into the speed of the vessel. Such structures have long been known and are typified by the T. W. Kenyon U.S. Pats. Nos. 1,955,502, 3,287,968, and 3,468,163.

Although such torsion arm speedometers are extremely satisfactory from the standpoint of giving an accurate indication of speed, the structures heretofore used have required some form of sealing between the water chamber and the torsion arm and despite all efforts to provide suitable waterproof seals, such structures eventually leak. In other words, the usual practice is to provide a chamber for the center of the torsion arm on which the vane is suspended and to pass this arm through supposedly water proof seals to gripping means at the outside extremities of the arm. At some point intermediate the seal and the grip, deflection produced on the arm is measured.

In accordance with the present invention, a hollow torsion arm is provided wherein the shaft which transmits the deflection extends through the hollow arm and out into the detecting and speed indicating mechanism. This permits the torsion arm itself to be positively sealed in a non-moving manner to the water chamber. This sealing can be by threading, welding, brazing or other positive sealing means so that the possibility of leakage is completely obviated.

BRIEF DESCRIPTION OF THE DRAWING

FIG. 1 is a sectional view, taken at right angles to the direction of vessel movement, of a speedometer mechanism embodying the present invention.

FIG. 2 is a sectional view on a reduced scale taken at right angles to FIG. 1.

FIG. 3 is a diagrammatic view of the structure shown in FIGS. 1 and 2, showing one manner in which movement of the torsion arm can be translated into a speed reading.

FIG. 4 is a partial sectional view, similar to FIG. 1, showing another embodiment of the invention wherein the torsion arm is a tube passing completely through the water chamber.

DESCRIPTION OF THE PREFERRED EMBODIMENT

Referring now to the drawing by reference characters, there is shown a boat bottom, generally designated 5, having an opening 7 which has been fitted with a water chamber 9 which is in fluid communication with the water 11 in which the boat is floating. Inside the chamber 9 is suspended a torsion arm generally designated 13 and to this is attached a vane or strut 15 which extends into the water. The torsion arm 13 has a center hub portion 17 and extending from this to the housing 9 are the arms 19 and 21. The arm 21 is hollow and through this extends torque transmission shaft or deflection transmitting shaft 23, one end of which is attached to the hub 17 by any suitable means such as a set screw 25. Shaft 23 can be fastened to the hub 17 by other means such as welding or brazing. The opposite end of shaft 23 extends to a detecting mechanism generally designated 27, described in more detail hereinafter. The torsion arm 13 is fastened to the chamber 9 by any suitable means which is water tight as by threading the parts together (not illustrated) or preferably by welding or brazing such as at the points designated 29.

It will be apparent that the shaft 23 will communicate any movement of the hub of the torsion arm out to the detector mechanism 27 yet at the same time there is no moving water seal so that there is no packing to wear or leak.

The speed indicating scheme itself forms no part of the present invention and can be any of the known systems for detecting small movements of the shaft 23. For instance, a purely mechanical movement might be used, electric resistance or magnetic means, pneumatic or hydraulic means or the like. However, a commonly used system for detecting such movements is illustrated. This consists of a pair of shutters 31 and 33 mounted on the end of shaft 23. A light source 35 shines through the slit provided by the shutters 31 and 33 onto a dual photocell 37 and the outputs from the dual photocell can be fed to a Wheatstone bridge, differential amplifier or the like and thence to an indicating mechanism to indicate the speed of the vessel.

In FIG. 4 another embodiment of the invention is shown which is substantially the same as that previously indicated and here the torsion shaft, instead of being hollow on one side only, consists of a tubular member 39 which extends through the chamber 9. It will be obvious that this tubular member can be sealed to the chamber, completely preventing leakage of water. Also, this embodiment provides a completely symmetrical structure.

Since the structure is rugged mechanically, the shaft need not extend completely through the chamber 9 but can be suspended from one side by the hollow arm. Thus, in FIG. 1, that portion of the torsion arm designated 19, i.e., the solid portion, could be completely eliminated and the hub 17 hung only from the tubular member 21.

It is obvious that many variations can be made in the exact structure shown without departing from the spirit of this invention.

I claim:

1. A boat speedometer, comprising a water chamber in said boat open to the surrounding body of water, a torsion arm fixedly mounted against rotation at its opposite ends in said water chamber, at least one end of said arm being tubular and having a hollow interior, said one end being open and establishing communication between the hollow interior of said arm and said boat exteriorly of said water chamber, said hollow interior isolated from said water chamber, a strut fixed to said arm in said water chamber and extending from said arm at an angle to the axis of the arm into the surrounding body of water, relative movement between the boat and the surrounding body of water causing said strut to pivot about the axis of said arm and to produce torsional deflection of said arm about its axis, a deflection transmitting means fixed to said arm within said hollow interior for movement with said arm and extending through said hollow interior to outside said water chamber and thus eliminating the need for separate sealing means to seal said deflection transmitting means relative to said water chamber, and a speed indicator means operatively connected to said deflection transmitting means externally of said chamber for indicating the speed of said boat based on the amount of torsional deflection of said arm and said deflection transmitting means.

2. The structure of claim 1 wherein said shaft carries a pair of optical shutters and the movement of said shutters controls the amount of light falling on a dual photocell and the outputs of said dual photocell are utilized to indicate the speed of the boat.

3. A boat speedometer as in claim 1, wherein the other end of said torsion arm is solid.

4. A boat speedometer as in claim 1, wherein said torsion arm is hollow throughout its length.

5. A boat speedometer as in claim 3, wherein said arm has a circumferentially enlarged portion intermediate its ends, and said strut is secured to said enlarged portion.

6. A boat speedometer as in claim 1, wherein said deflection transmitting means is secured in said hollow interior by a set screw threaded through one side of said arm and in engagement with said deflection transmitting means.

* * * * *